United States Patent [19]

Komaki

[11] Patent Number: 5,392,462

[45] Date of Patent: Feb. 21, 1995

[54] PORTABLE WIRELESS TELEPHONE APPARATUS WITH USE SPECIFIC POWER MONITORING

[75] Inventor: Norio Komaki, Fukuoka, Japan

[73] Assignee: Matsushita Electric Industrial Co., Ltd., Japan

[21] Appl. No.: 945,874

[22] Filed: Sep. 17, 1992

[30] Foreign Application Priority Data

Sep. 27, 1991 [JP] Japan .................. 3-248996

[51] Int. Cl.6 .................. H04B 1/40; H04M 11/00
[52] U.S. Cl. .................. 455/89; 455/127; 455/343; 379/59; 379/61
[58] Field of Search .................. 455/89, 95, 127, 343, 455/351, 33.1; 379/58, 61, 59

[56] References Cited

U.S. PATENT DOCUMENTS

| | | | |
|---|---|---|---|
| 4,989,230 | 1/1991 | Gillig et al. | 379/59 |
| 5,117,449 | 5/1992 | Metroka et al. | 379/58 |
| 5,127,042 | 6/1992 | Gillig et al. | 379/59 |

Primary Examiner—Curtis Kuntz
Assistant Examiner—Chi Pham
Attorney, Agent, or Firm—Parkhurst, Wendel & Rossi

[57] ABSTRACT

In a portable wireless telephone capable of providing a cellular mode which allows users to place or receive telephone calls through a cellular telephone network and a cordless mode which allows the users to place or receive telephone calls through an associated base unit of a cordless telephone, a battery voltage is monitored to check whether or not the battery voltage is so lowered that the cellular mode becomes inoperative. An LCD unit displays a low-voltage warning if the battery voltage is lowered down to such a low level. However, a micro computer equipped in this portable wireless telephone allows the users to use this portable wireless telephone as a cordless telephone. Accordingly, this portable wireless telephone can be still activated in the cordless mode even if it cannot be no longer used as a cellular telephone.

7 Claims, 5 Drawing Sheets

PORTABLE WIRELESS TELEPHONE APPARATUS WITH USE SPECIFIC POWER MONITORING

BACKGROUND OF THE INVENTION

1. Field of the Invention

The present invention relates to an improved portable wireless telephone (i.e. a walkie Talkie) capable of providing both cellular and cordless telephone services.

2. Description of the Prior Art

Conventionally, cellular mode portable telephones have become popular, which can allow users to place or receive telephone calls at any point throughout a cellular network. On the other hand, cordless telephones have also become popular, which are typically used in the home. The cordless telephone consists of a base unit connected to a user's telephone landline and a wireless portable telephone unit associated with this base unit. Therefore, the cordless telephone enables the user to place a telephone call at any point throughout the home.

A cellular telephone is convenient when the user goes out of the office or the home, since it allows the user to place and receive telephone calls at any point throughout a large metropolitan area. However, the cost of a cellular telephone call is expensive since cellular telephone calls are made by way of expansive cellular base stations and cellular switching equipment.

Furthermore, when the user returns home, the user may want to use a cordless telephone rather than a cellular telephone. In such a case, the user needs to possess both a cellular telephone and a cordless telephone. Since these two telephone are fundamentally different, the ways of their uses are also different and, therefore, it was troublesome to use these different type telephones properly.

In order to resolve such a problem, it has been proposed a wireless portable telephone which is constituted to integrate a cellular telephone and a cordless telephone into one combined telephone and is capable of providing both cellular and cordless telephone services, as disclosed, for example, in Japanese Unexamined Patent Application No. HEI 3-1621 which is originated from the U.S. Pat. application Ser. No. 249, 041 filed on Sep. 23, 1988 and patented as the U.S. Pat. No. 4,989,230 on Jan. 29, 1991, or in the U.S. Pat. No. 5,127,042 patented on Jun. 30, 1992.

Hereinafter, with reference to FIGS. 4 and 5, a typical conventional portable wireless telephone is explained. A reference numeral 122 denotes a portable wireless telephone unit. A reference numeral 123 denotes a cellular base station in a cellular telephone network. And, a reference numeral 124 denotes a base unit of a cordless telephone.

In the case where the user wants to use this portable wireless telephone unit 122 as a cellular telephone, the user manipulates a mode selecting switch to activate a cellular mode. By the selection of the cellular mode, the portable wireless telephone unit 122 is situated in a condition for waiting a slave signal sent from the cellular base station 123. On the contrary, in such a waiting condition, it is possible for the user to place a telephone call through the cellular telephone network.

Figure 4:
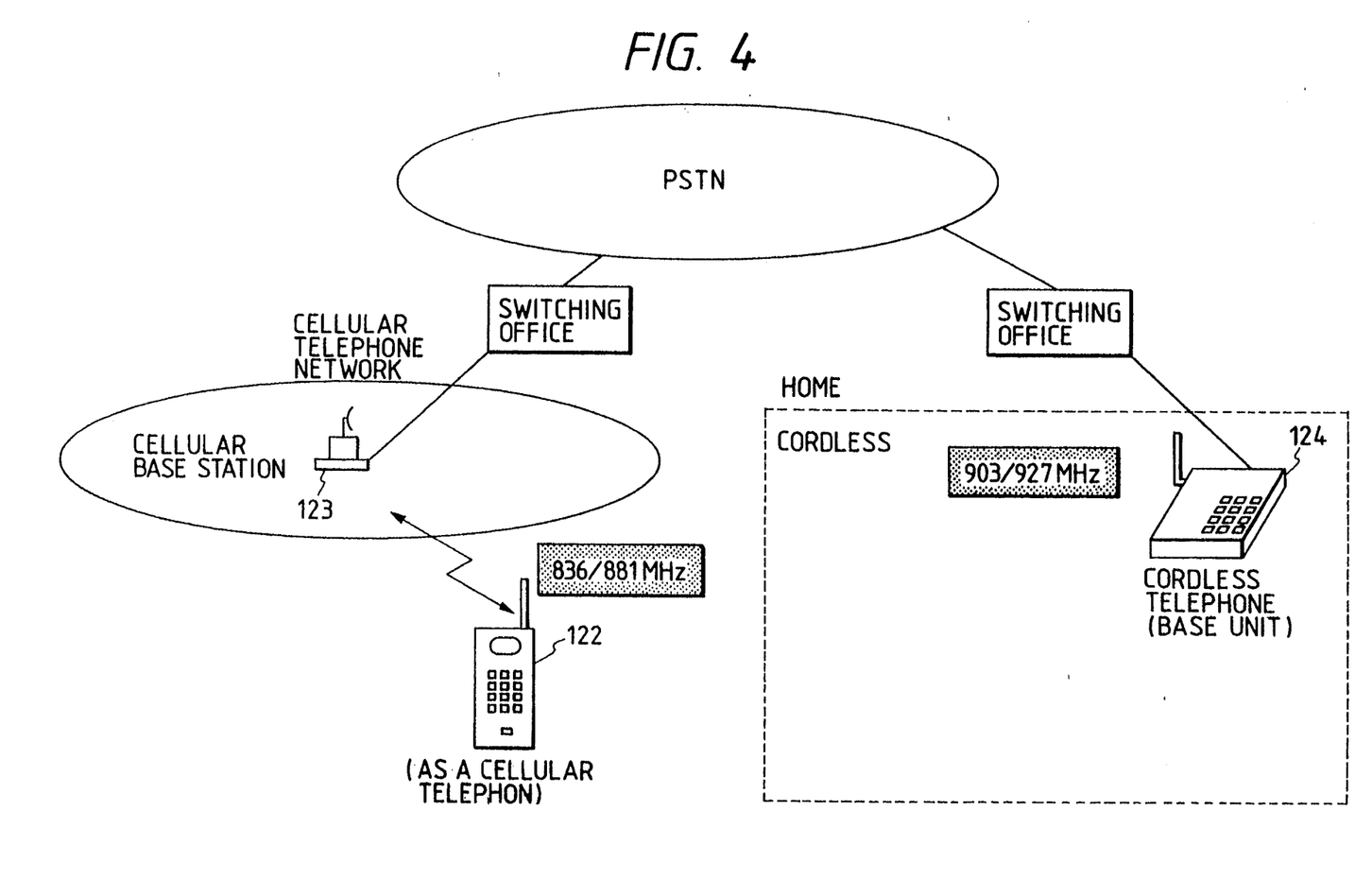
FIG. 4 is an explanatory view illustrating a conventional portable wireless telephone apparatus being used as a cellular telephone.
Figure 5:
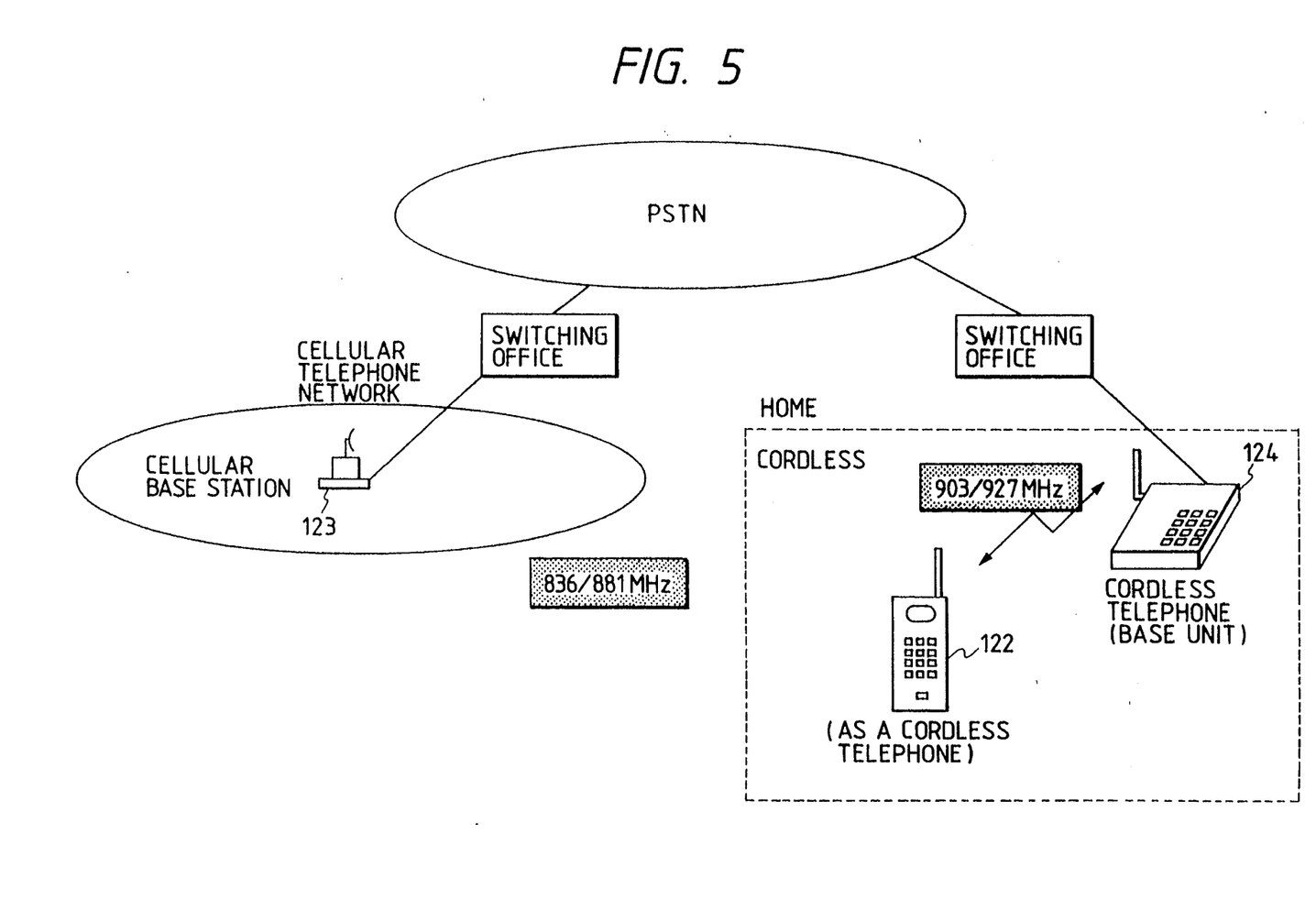
FIG. 5 is an explanatory view illustrating a conventional portable wireless telephone apparatus being used as a portable unit of a cordless telephone.

When the user places a telephone call, or when a telephone call is received, the portable wireless telephone unit 122 is engaged with the cellular base station 123 by way of a cellular radio channel of the cellular telephone network as shown in FIG. 4.

Furthermore, in the case where the user wants to use this portable wireless telephone unit 122 as a cordless telephone, the user manipulates the mode selecting switch to activate a cordless mode. By the selection of the cordless mode, the portable wireless telephone unit 122 is situated in a condition for waiting a slave signal sent from the base unit 124 of the cordless telephone. In such a waiting condition, it is also possible for the user to place a telephone call by manipulating an operational portion such as switches or buttons.

In waiting or calling conditions, a voltage detecting unit provided in the portable wireless telephone unit 122 keeps monitoring a remaining voltage of an installed battery. Therefore, when the voltage detecting unit detects that the battery voltage is decreased down to an inoperative level, a low-voltage detecting signal is outputted. In response to this low-voltage detecting signal, a display unit indicates that the battery voltage is so lowered that an immediate charging operation is required. Furthermore, in a calling condition, a telephone call is forcibly hung up.

However, in the above-described conventional constitution, a service area of a cellular telephone network is generally wider than that of a cordless telephone. An electric power required for transmitting signals or data of the cellular telephone is fairly larger than that of the cordless telephone. Therefore, an electric power consumption of the battery become larger in the cellular telephone mode.

A low-voltage detecting level of the voltage detecting unit is set relatively higher for detecting an inoperative level in view of a large electric power consumption in the cellular telephone mode, so that the portable wireless telephone unit 122 can be surely supplied with electric power an amount of which satisfies a regulation required for a cellular telephone.

For this reason, this portable wireless telephone unit 122 is completely deactivated when the battery voltage is lowered down to the predetermined low-voltage detecting level so as to disable its transmitting function even if it can be still used as a cordless telephone. Therefore, there was a problem such that the portable wireless telephone unit cannot be used once the low-voltage detecting signal is generated even if the remaining battery voltage is still sufficient enough for activating a cordless telephone mode.

SUMMARY OF THE INVENTION

The present invention has a purpose, in view of above-described problems or disadvantages encountered in the prior art, to provide a portable wireless telephone apparatus capable of being used as a cordless telephone when a battery voltage is reduced down to an inoperative level for a cellular telephone mode, as long as the remaining battery voltage is sufficient large enough for serving as a cordless telephone.

In order to accomplish above purpose, the present invention provides an improved portable wireless telephone apparatus providing both cellular and cordless telephone modes, which comprises a first voltage detecting means for generating a first low-voltage detecting signal in the case where a battery voltage is so lowered that the cellular telephone mode is inoperative, and a second voltage detecting means for generating a second low-voltage detecting signal in the case where the battery voltage is so lowered that the cordless telephone mode is inoperative.

Then, in response to the first low-voltage signal outputted from the first voltage detecting means, a display means is controlled to generate a warning such that the cellular mode is inoperative. And further, in response to the second low-voltage signal outputted from the second voltage detecting means, the display means is controlled to generate a warning such that all the modes (i.e. both the cellular and the cordless modes) are inoperative.

With above-described constitution, a portable wireless telephone apparatus in accordance with the present invention can be still used as a cordless telephone after a battery voltage is reduced down to an inoperative level as a cellular telephone mode, as long as the remaining battery voltage is sufficient large enough for serving as a cordless telephone.

The above and other objects, features and advantages of the present invention will become more apparent from the following detailed description which is to be read in conjunction with the accompanying drawings.

DETAILED DESCRIPTION OF THE PREFERRED EMBODIMENT

Figure 1:
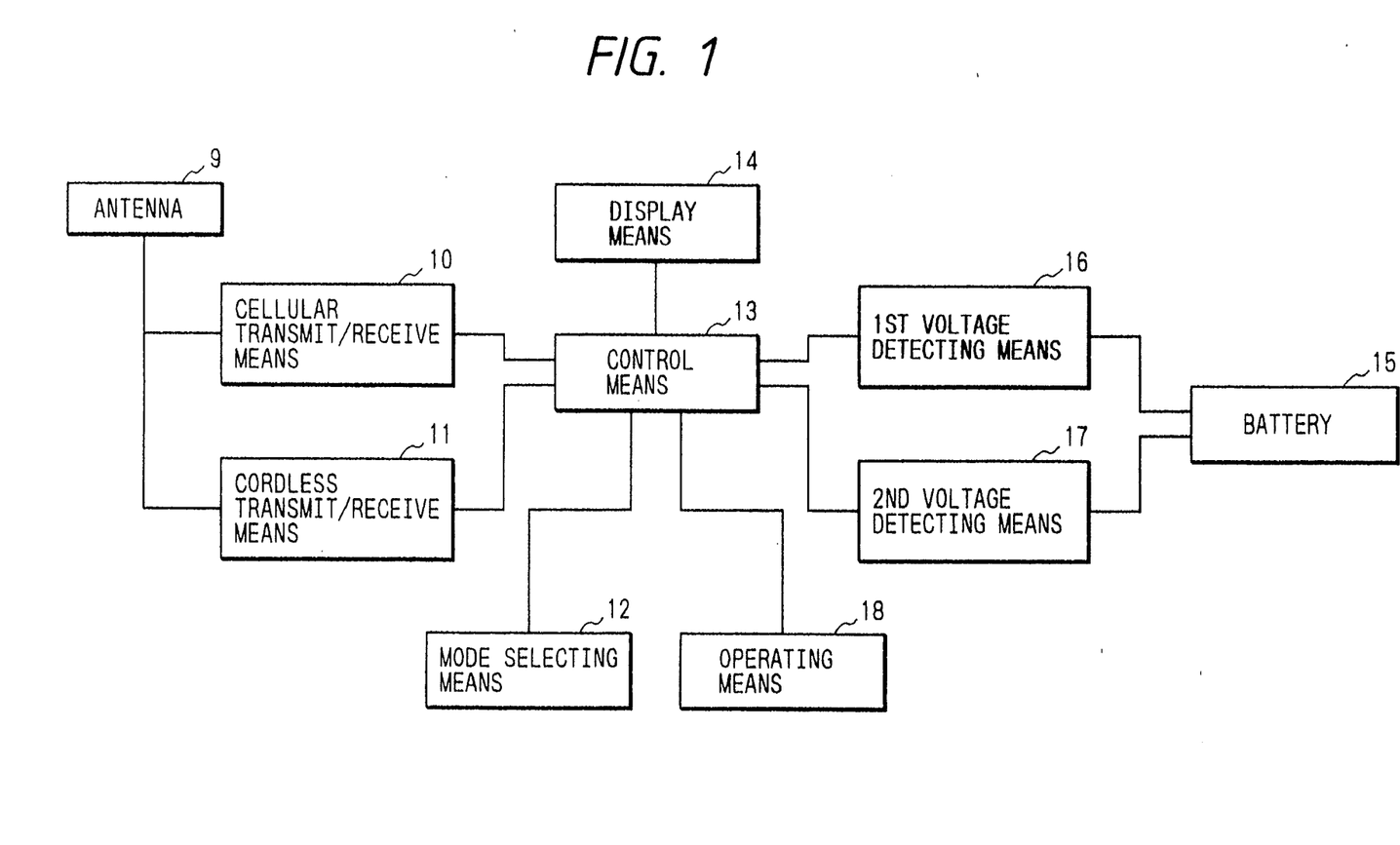
FIG. 1 is a schematic block diagram showing characteristic features and functions of a portable wireless telephone apparatus in accordance with one embodiment of the present invention.

Hereinafter, referring now to the accompanying drawings, an embodiment of the present invention is explained in detail. FIG. 1 is a schematic block diagram showing characteristic features and functions of a portable wireless telephone apparatus in accordance with one embodiment of the present invention.

In FIG. 1, a reference numeral 9 denotes an antenna, and a reference numeral 10 denotes a cellular transmit/receive means which communicates with a cellular base station through a cellular radio channel. That is, the cellular transmit/receive means 10 transmits radio signals to or receives radio signals from the cellular base station. A reference numeral 11 denotes a cordless transmit/receive means which communicates with a base unit of a cordless telephone through a cordless radio channel. That is, the cordless transmit/receive means 11 transmits radio signals to or receives radio signals from the base unit of the cordless telephone.

A reference numeral 12 denotes a mode selecting means constituted by switches for selecting an operational mode between a cellular mode and a cordless mode. A reference numeral 13 denotes a control means constituted by a micro computer for controlling the apparatus to function as a cellular telephone by using the cellular transmit/receive means 10 in the case where the mode selecting means 12 selects a cellular mode and further controlling the apparatus to function as a cordless telephone by using the cordless transmit/receive means 11 in the case where the mode selecting means 12 selects a cordless mode.

A reference numeral [4 denotes a display means for indicating various information including warning to the user in both of cellular and cordless modes. A reference numeral 15 denotes a battery for supplying electric power to the portable wireless telephone. Usually, a rechargeable Ni—Cd battery is suitable for this battery 15.

A reference numeral 16 denotes a first voltage detecting means for outputting a first low-voltage detecting signal to the control means 13 when a remaining voltage of the battery 15 is reduced down to an inoperative level as a cellular telephone. And, a reference numeral 17 denotes a second voltage detecting means for outputting a second low-voltage detecting signal to the control means 13 when the remaining voltage of the battery 15 is reduced down to an inoperative level as a cordless telephone. Furthermore, a reference numeral 18 denotes an operating means for allowing the user to operate various functions.

Hereinafter, an operation of the above-described portable wireless telephone is explained in detail. When the user wants to use this portable wireless telephone unit as a cellular telephone, the mode selecting means 12 is operated to select a cellular mode.

In response to the selection of the cellular mode, the control means 13 controls the cellular transmit/receive means 10 to receive data sent from the cellular base station so that the cellular transmit/receive means 10 is situated in a waiting condition for receiving a slave signal from the cellular telephone network. Moreover, in this waiting condition, the user can place a telephone call by manipulating the operating means 18.

If the slave signal is received or the user places the telephone call, the control means 13 carries out a series of protocol sequence through the cellular radio channel to situate a calling condition.

On the other hand, in calling or waiting condition, the first voltage detecting means 16 monitors the voltage of the battery 15. When the first voltage detecting means 16 detects that the battery voltage is reduced down to an inoperative level as a cellular telephone, the first low-voltage detecting signal is outputted.

When the control means 13 receives the first low-voltage detecting signal, the control means 13 controls the display means 14 to generate a warning in such a manner that the battery is required to charge or the cellular mode is inoperative. Furthermore, in case of a calling condition, the telephone call is forcibly ended. Moreover, the mode selecting means 12 is controlled to no longer select the cellular mode.

When the user wants to use this portable wireless telephone unit as a cordless telephone, the mode selecting means 12 is operated to select a cordless mode. In response to the selection of the cordless mode, the control means 13 controls the cordless transmit/receive means 11 to be situated in a waiting condition for receiving a slave signal sent from the base unit of the cordless telephone. Moreover, in this waiting condition, the user can place a telephone call by manipulating the operating means 18.

If the slave signal is received or the user places the telephone call, the control means 13 carries out a series of protocol sequence through the cellular radio channel to situate a calling condition.

On the other hand, in such a calling or waiting condition, the second voltage detecting means 17 monitors the voltage of the battery 15. When the second voltage detecting means 17 detects that the battery voltage is further reduced down to an inoperative level as a cordless telephone, the second low-voltage detecting signal is outputted.

When the control means 13 receives the second low-voltage detecting signal, the control means 13 controls the display means 14 to generate a warning in such a manner that the battery is required to charge or the cordless mode is inoperative. Furthermore, in case of a calling condition, the telephone call is forcibly ended. Moreover, the mode selecting means 12 is controlled not to select any of both the cellular mode and the cordless mode.

Figure 2:
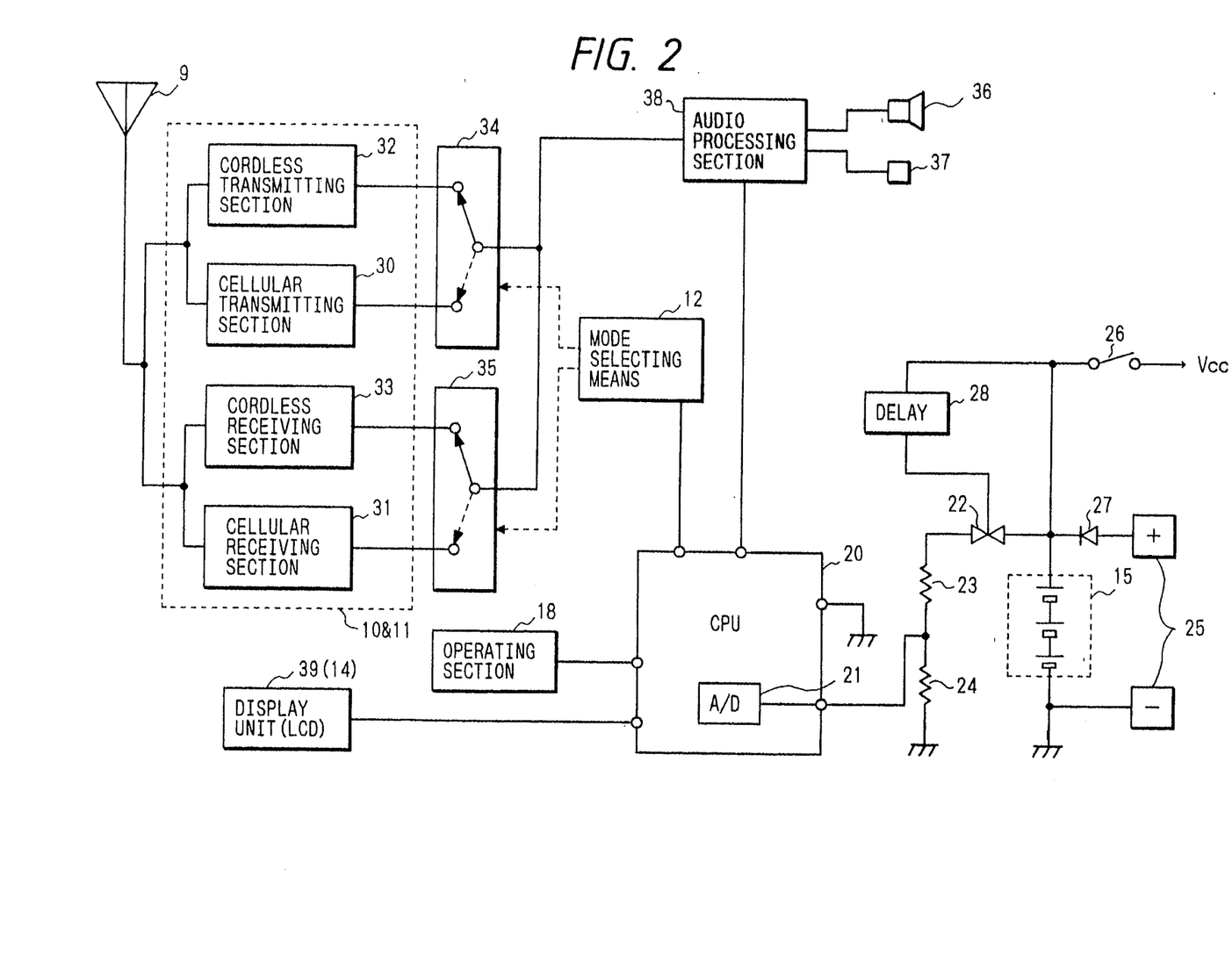
FIG. 2 is a block diagram showing a detailed constitution of the portable wireless telephone apparatus in accordance with said one embodiment of the present invention.
Figure 3:
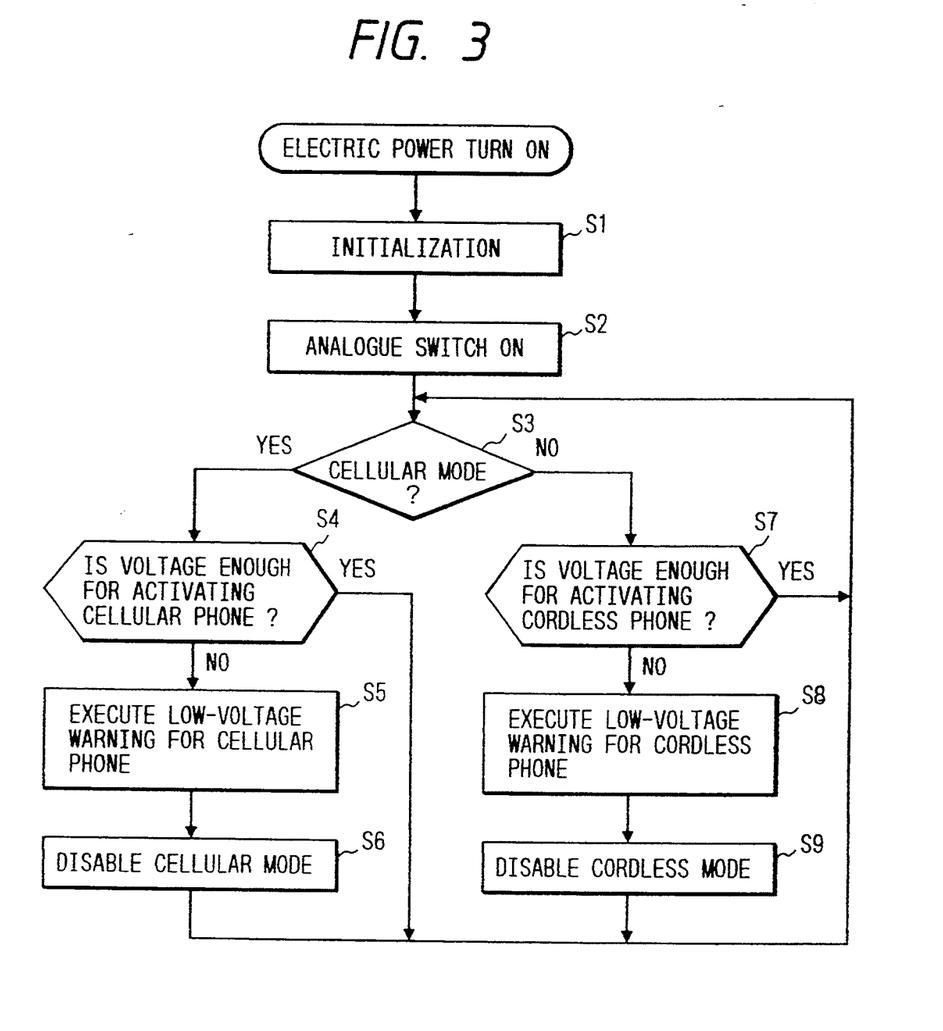
FIG. 3 is a flow chart showing a control procedure of a control unit in the portable wireless telephone apparatus in accordance with said one embodiment of the present invention.

FIG. 2 is a block diagram showing a detailed constitution of the portable wireless telephone apparatus in accordance with one embodiment of the present invention. Furthermore, FIG. 3 is a flow chart showing a control procedure of a control unit in the portable wireless telephone apparatus in accordance with one embodiment of the present invention.

In FIG. 2, a reference numeral 20 denotes a micro computer serving as the control means which accommodates an A/D converter 21 (For example, the micro computer M377032 manufactured by Mitsubishi Electric Co. Ltd.) A reference numeral 22 denotes an analogue switch, and reference numerals 23 and 24 denote voltage dividing resistances.

Reference numerals 25, 25 denote charging terminals of this portable wireless telephone unit, and a reference numeral 26 denotes an electric power switch. When this portable wireless telephone unit is mounted on the base unit of the cordless telephone, these charging terminals 25, 25 are electrically connected with the corresponding charging terminals of the base unit of the cordless telephone. Charging current is supplied from a charger equipped in the base unit through these charging terminals so as to charge the battery 15. A reference numeral 27 denotes a diode for preventing a back-flow of current.

The analogue switch 22 functions to prevent the A/D converter 21 from being latched.-up upon the turning-on of the electric power. A reference numeral 28 denotes a delay circuit for turning on the analogue switch 22 when a predetermined time has elapsed after the electric power switch 26 was closed.

A reference numeral 30 denotes a cellular transmitting section, and a reference numeral 31 denotes a cellular receiving section. These cellular transmitting section 30 and the cellular receiving section 31 constitute the abovedescribed cellular transmit/receive means 10.

A reference numeral 32 denotes a cordless transmitting section, and a reference numeral 33 denotes a cordless receiving section. These cordless transmitting section 32 and the cordless receiving section 33 constitute the above-described cordless transmit/receive means 11.

Reference numerals 34 and 35 denote changeover switches which are changed over together in accordance with a signal sent from the mode selecting means 12. A reference numeral 36 denotes a speaker, and a reference numeral 37 denotes a microphone. Further, a reference numeral 38 denotes an audio processing section connected to the speaker 36 and the microphone 37. And, a reference numeral 39 is a liquid crystal display (LCD) unit capable of displaying a decline of the battery voltage or other various information in a written form. This liquid crystal display unit 39 is a specific example of the previously explained display means 14.

When the electric power switch 26 is closed, an electric power voltage from the battery 15 is applied to various units including the micro computer 20. Then, the micro computer 20 initializes ports or interior registers and the like. Subsequently, the analogue switch 22 is turned on and, therefore, the A/D converter 21 is applied with a voltage which is fed by dividing the battery voltage in accordance with a ration of the voltage dividing resistances 23, 24. The A/D converter 21 transforms the inputted voltage into a numerical value (i.e. into a digital value) so that the micro computer 20 can read it.

The micro computer 20 memorizes in advance a first minimum battery voltage required for activating this portable wireless telephone unit as a cellular telephone, and a second minimum battery voltage required for activating this portable wireless telephone unit as a cordless telephone, so as to use these values as reference values when checking the remaining voltage of the battery 15. In this embodiment, the A/D converter 21 in the micro computer 20 and the program shown in FIG. 3 constitute the previously described first voltage detecting means 18 and the second voltage detecting means 17.

For instance, in the case where this portable wireless telephone unit is operated in the cellular mode, the micro computer 20 compares the actual remaining voltage value which is A/D transformed in the A/D converter 21 with the above-described first minimum battery voltage. If the actual remaining battery voltage is lower than the first minimum battery voltage, the micro computer 20 controls the display unit 39 to generate a warning of a low-voltage as a cellular mode.

On the other hand, in the case where this portable wireless telephone unit is operated in the cordless mode, the micro computer 20 compares the actual remaining voltage value which is A/D transformed in the A/D converter 21 with the above-described second minimum battery voltage. If the actual battery voltage is lower than the second minimum battery voltage, the micro computer 20 controls the display unit 39 to generate a warning of a low-voltage as both cellular and cordless modes.

In general, an electric power consumption as a cordless telephone is smaller than an electric power consumption as a cellular telephone. Accordingly, the second minimum battery voltage which corresponds to a minimum voltage enabling this portable wireless telephone unit to work as a cordless telephone is set lower than the first minimum battery voltage which corresponds to a minimum voltage enabling this portable wireless telephone unit to work as a cellular telephone.

FIG. 3 is a flow chart showing a control procedure of a control means 13 in the portable wireless telephone apparatus in accordance with above-described one embodiment of the present invention. Hereinafter, with reference to this flow chart, its operation can be explained as follows.

When an electric power is turned on, first of all ports or registers are initialized in a step S1. Next, in a step S2, the analogue switch 22 shown in FIG. 2 is closed. Then, the battery voltage is inputted into the A/D converter 21.

In a step S3, it is judged whether or not the mode is the cellular mode. If the judgement in the step S3 is YES, the micro computer 20 proceeds to a step S4. To the contrary, if the judgement in the step S3 is NO (i.e. if the mode is the cordless mode), the micro computer 20 proceeds to a step S7.

In a step S4, it is further checked whether or not the battery voltage inputted by being A/D converted is large enough to activate the portable wireless telephone unit as a cellular telephone. If the judgement in the step S4 is NO, the micro computer 20 proceeds to a step S5. In the step S5, the micro computer 20 controls the LCD unit 39 to generate a low-voltage warning for a cellular telephone mode.

Subsequently, in a step S6, the micro computer 20 controls the mode selecting means 12 to prevent the portable wireless telephone unit from being used as a cellular telephone unless this portable wireless telephone unit is charged again up to an adequate voltage for activating it as a cellular telephone.

If the judgement in the step S4 is YES, the micro computer 20 returns to the step S3 as shown in the flow chart.

Similarly, in the step S7, it is further checked whether or not the battery voltage inputted by being A/D converted is large enough to activate the portable wireless telephone unit as a cordless telephone. If the judgement in the step S7 is NO, the micro computer 20 proceeds to a step S8. In the step S8, the micro computer 20 controls the LCD unit 39 to generate a low-voltage warning for a cordless telephone mode.

Subsequently, in a step S9, the micro computer 20 controls the mode selecting means 12 to prevent the portable wireless telephone unit from being used as a cordless telephone unless this portable wireless telephone unit is charged again up to an adequate voltage for activating it as a cordless telephone. Since the minimum battery voltage required for activating the cordless telephone is lower than that of the cellular telephone, all the modes (i.e. the cellular mode and the cordless mode) are disabled by the control carried out in accordance with the step S9.

If the judgement in the step S7 is YES, the micro computer 20 returns to the step S3 as shown in the flow chart.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A portable wireless telephone comprising:
an antenna;
a cellular transmit/receive means connected to said antenna for transmitting data to or receiving data from a cellular base station;
a cordless transmit/receive means connected to said antenna for transmitting data to or receiving data from a base unit of a cordless telephone;
a mode selecting means for selecting an operation mode of the portable wireless telephone between a cellular mode and a cordless mode;
a battery;
a voltage detecting means connected to said battery for generating a low-voltage signal if a battery voltage is not large enough to operate the portable wireless telephone in the cellular mode;
a display means;
a control means for controlling said display means to generate a low-voltage warning, which indicates that the cellular mode is no longer operative, whenever said voltage detecting means generates the low-voltage signal when the portable wireless telephone is operated in the cellular mode, and for further controlling said mode selecting means to prevent selection of the cellular mode while permitting selection of the cordless mode as long as said battery voltage is large enough to operate the portable wireless telephone in the cordless mode.

2. A portable wireless telephone comprising:
an antenna;
a cellular transmit/receive means connected to said antenna for transmitting data to or receiving data from a cellular base station;
a cordless transmit/receive means connected to said antenna for transmitting data to or receiving data from a base unit of a cordless telephone;
a mode selecting means for selecting an operation mode of the portable wireless telephone between a cellular mode and a cordless mode;
a battery;
a first voltage detecting means connected to said battery for generating a first low-voltage signal if a battery voltage is not large enough to activate the portable wireless telephone as a cellular telephone;
a second voltage detecting means connected to said battery for generating a second low-voltage signal if the battery voltage is not large enough to activate the portable wireless telephone as a cordless telephone;
a display means; and
a control means wherein said control means controls said display means to generate a first low-voltage warning, which indicates that only the cellular mode is no longer operative, whenever said first voltage detecting means generates the first low-voltage signal, and further controls said display means to generate a second low-voltage warning, which indicates that all the modes are no longer operative, whenever said second voltage detecting means generates the second low voltage signal.

3. A portable wireless telephone in accordance with claim 2 in which said control means further controls said mode selecting means not to select the cellular mode in response to a detection of said first low-voltage signal.

4. A portable wireless telephone in accordance with claim 2 in which said control means further controls said mode selecting means not to select the cordless mode in response to a detection of said second low-voltage signal.

5. A portable wireless telephone comprising:
an antenna;
a cellular transmit/receive means connected to said antenna for transmitting data to or receiving data from a cellular base station;
a cordless transmit/receive means connected to said antenna for transmitting data to or receiving data from a base unit of a cordless telephone;

a mode selecting means for selecting an operation mode of the portable wireless telephone between a cellular mode and a cordless mode;

a battery;

a micro computer accommodating an A/D converter and memorizing a first minimum battery voltage required for activating the portable wireless telephone as a cellular telephone and a second minimum battery voltage required for activating the portable wireless telephone as a cordless telephone, so that the minimum battery voltage values can be used as reference values when checking a remaining voltage of the battery;

a display means; and wherein said micro computer causes said A/D converter to transform the remaining battery voltage into a digital value and compares the remaining battery voltage value which is A/D transformed in the A/D converter with said first minimum battery voltage, so that said micro computer controls the display means to generate a warning of a low-voltage as a cellular mode if the remaining battery voltage is lower than the first minimum battery voltage, and further comparing the remaining battery voltage value which is A/D transformed in the A/D converter with said second minimum voltage, so that said micro computer controls the display means to generate a warning of a low-voltage as both cellular and cordless modes if the remaining battery voltage is lower than the second minimum battery voltage.

6. A portable wireless telephone in accordance with claim 5 in which said micro computer further controls said mode selecting means not to select the cellular mode when the remaining battery voltage is lower than the first minimum battery voltage.

7. A portable wireless telephone in accordance with claim 5 in which said micro computer further controls said mode selecting means not to select the cordless mode when the remaining battery voltage is lower than the second minimum battery voltage.

* * * * *